(12) United States Patent
Shimizu

(10) Patent No.: US 8,533,135 B2
(45) Date of Patent: Sep. 10, 2013

(54) MODEL GENERATING DEVICE AND MODEL GENERATING METHOD

(75) Inventor: Toshihiro Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 404 days.

(21) Appl. No.: 13/076,700

(22) Filed: Mar. 31, 2011

(65) Prior Publication Data

US 2012/0030155 A1    Feb. 2, 2012

(30) Foreign Application Priority Data

Jul. 28, 2010    (JP) ................................. 2010-169812

(51) Int. Cl.
  *G06F 15/18*    (2006.01)
(52) U.S. Cl.
  USPC ............................................. 706/12; 706/13
(58) Field of Classification Search
  None
  See application file for complete search history.

(56) References Cited

U.S. PATENT DOCUMENTS

| | | | |
|---|---|---|---|
| 7,200,260 B1 * | 4/2007 | Watanabe et al. .............. 382/153 |
| 7,308,432 B2 * | 12/2007 | Torii et al. ........................ 706/21 |
| 7,366,595 B1 * | 4/2008 | Shimizu et al. ................ 701/301 |
| 7,409,342 B2 * | 8/2008 | Kashima et al. ............... 704/240 |
| 7,603,277 B2 * | 10/2009 | Kashima et al. ............... 704/257 |
| 7,640,107 B2 * | 12/2009 | Shimizu et al. ................ 701/523 |
| 7,640,108 B2 * | 12/2009 | Shimizu et al. ................ 701/301 |
| 7,698,137 B2 * | 4/2010 | Kashima et al. ............... 704/255 |
| 7,738,990 B2 * | 6/2010 | Furukawa et al. ............. 700/141 |
| 7,873,594 B2 | 1/2011 | Harada et al. |
| 8,013,231 B2 * | 9/2011 | Fujishima et al. ............... 84/626 |
| 8,023,704 B2 * | 9/2011 | Oosawa ........................ 382/128 |
| 8,400,313 B2 * | 3/2013 | Noguchi et al. ............... 340/576 |
| 8,433,573 B2 * | 4/2013 | Murase et al. ................ 704/260 |

FOREIGN PATENT DOCUMENTS

| | | |
|---|---|---|
| JP | 2006-011683 A | 1/2006 |
| JP | 2006-011683 A | 1/2006 |

* cited by examiner

*Primary Examiner* — Michael B Holmes
(74) *Attorney, Agent, or Firm* — Fujitsu Patent Center

(57) ABSTRACT

A model generating device acquires event information including a time when execution of an event is started, a time when execution of the event is finished, and the type of the event. The model generating device assumes model candidates each showing a relationship between an event and another event triggered by the former event on the basis of the acquired event information, and makes a combination of the assumed model candidates. The model generating device searches the assumed model candidates to find a candidate that matches an existing model. The model generating device withdraws the model candidate searched for from the combination of the model candidates, and withdraws a candidate that is to be withdrawn from the combination of the model candidates in association with withdrawal of the model candidate found as a result of the search, thereby updating the combination of the model candidates. The model generating device thereafter generates a new model on the basis of the updated combination of the model candidates.

6 Claims, 16 Drawing Sheets

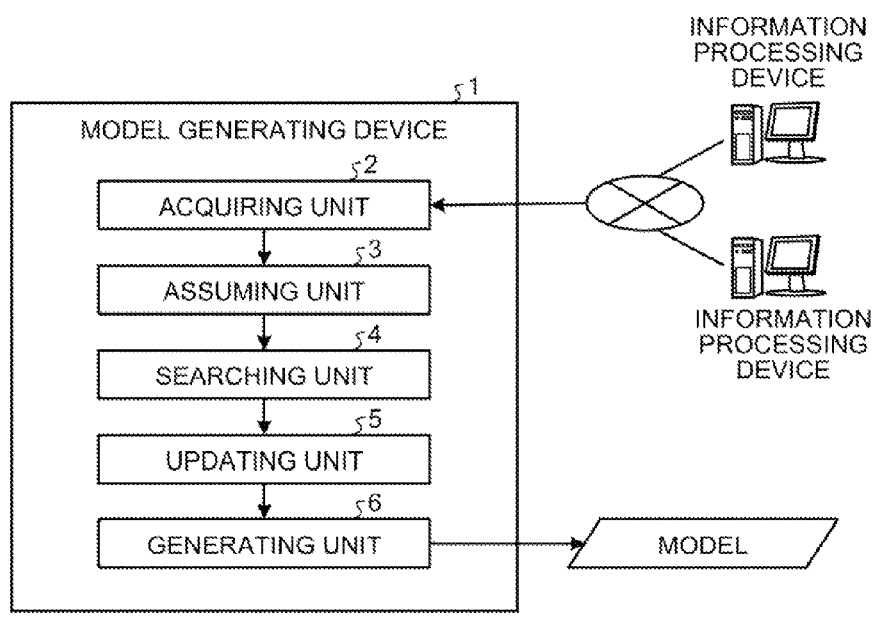
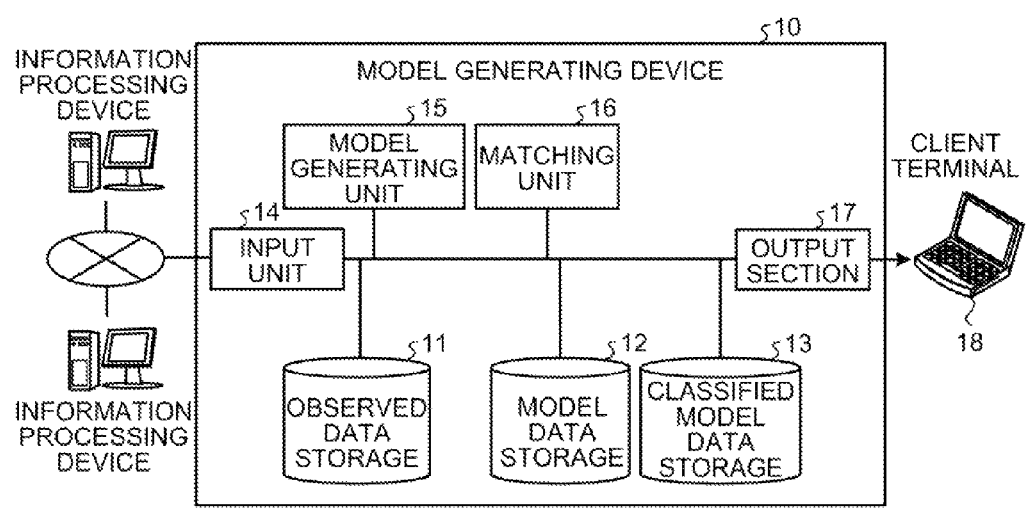

MODEL GENERATING DEVICE AND MODEL GENERATING METHOD

CROSS-REFERENCE TO RELATED APPLICATION

This application is based upon and claims the benefit of priority of the prior Japanese Patent Application No. 2010-169812, filed on Jul. 28, 2010, the entire contents of which are incorporated herein by reference.

FIELD

The embodiments discussed herein are directed to a model generating device and a model generating method.

BACKGROUND

According to a technique conventionally known, a plurality of information processing devices cooperate with each other to perform one process as a plurality of events. In a system employing this technique, an event executed by an information processing device may trigger an event to be executed by a different information processing device. This makes it difficult to analyze the performance of the entire system or a cause of a trouble on the basis of a program of each information processing device.

According to a known technique of a model generating device, a model of a relationship between an event and another event triggered by the former event is generated. This makes it possible to easily analyze the performance of an entire system, or a cause of a trouble. In the example illustrated in FIG. 18, a model generating device observes communications between information processing devices contained in a system, and acquires information indicating a time period during which each information processing device executed an event.

The model generating device assumes a candidate of a relationship between an event and another event triggered by the former event on the basis of the acquired information. Then, the model generating device specifies a model indicating a relationship between an event and another event triggered by the former event by using the regularity of the assumed candidate. The model generating device thereafter compares communications between the information processing devices with the generated models. As a result, the performance of the system itself, or a cause of a trouble is easily analyzed. FIG. 18 is a diagram illustrating the model generating device.

A model generated by the model generating device is described next by using FIGS. 19 and 20. In the example illustrated in FIG. 19, IIOP 1 that is an event of IIOP (Internet Inter-ORB Protocol) is executed during execution of HTTP 1 that is an event of HTTP (Hypertext Transfer Protocol). In this example, the model generating device assumes that HTTP 1 triggered IIOP 1, and generates a model of a tree structure in which HTTP 1 as a master and IIOP 1 as a slave are associated with each other. FIG. 19 is a diagram (1) illustrating the model.

In the example illustrated in FIG. 20, IIOP 1 and IIPO 2 are executed during execution of HTTP 1. In this example, a model generating device assumes that HTTP 1 triggered two processes of IIOP 1 and IIOP 2, and generates a model of a tree structure in which HTTP 1 as a master, and IIOP 1 and IIPO 2 as slaves are associated with each other. FIG. 20 is a diagram (2) illustrating the model.

A matching process of a model performed by the model generating device is described next by using FIG. 21. FIG. 21 is a diagram illustrating the matching process. The model generating device of the example illustrated in FIG. 21 have already generated a model indicating that HTTP 1 (H1) triggered IIOP 1 (I1), and a model indicating that HTTP 2 (H2) triggered IIOP 2 (I2). In this case, the model generating device performs a matching process to detect the same relationships from assumed model candidates as those of the models already generated. As a result, the performance of an entire system, or a cause of a trouble is easily analyzed.

In the aforementioned technique of the model generating device, a candidate to be assumed will be made complex if a large number of events are executed at the same time. This requires a massive amount of calculation to generate a model, making it impossible to generate a model.

As seen from the example on the left side of FIG. 22, the model generating device can generate models in a limited time if model candidates assumed from information flowing through a network are simple. However, if a large number of events are executed at the same time, model candidates assumed from information passing through the network are made complex as seen from the example on the right side of FIG. 22. In this case, the model generating device cannot generate a model in a limited time. Herein, FIG. 22 is a diagram illustrating the volumes of relationships in data.

Patent Document: Japanese Laid-open Patent Publication No. 2006-011683

SUMMARY

According to an aspect of an embodiment of the invention, a model generating device includes an acquiring unit that observes information flowing through a network to which a plurality of information processing devices are connected that execute a plurality of events in a hierarchical structure, the acquiring unit acquiring event information including a time when execution of an event is started, a time when execution of the event is finished, and a type of the event; an assuming unit that assumes model candidates each showing a relationship between an event and another event triggered by the former event on the basis of the event information acquired by the acquiring unit, and makes a combination of the assumed model candidates; a searching unit that searches the model candidates assumed by the assuming unit for a candidate that matches an existing model; an updating unit that withdraws the model candidate searched for by the searching unit from the combination of the model candidates, and withdraws a candidate that is to be withdrawn from the combination of the model candidates in association with withdrawal of the model candidate found as a result of the search, thereby updating the combination of the model candidates; and a generating unit that generates a new model on the basis of the combination of the model candidates updated by the updating unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram illustrating a model generating device according to a first embodiment;

FIG. 2 is a diagram illustrating a model generating device according to a second embodiment;

DESCRIPTION OF EMBODIMENTS

Figure 3:
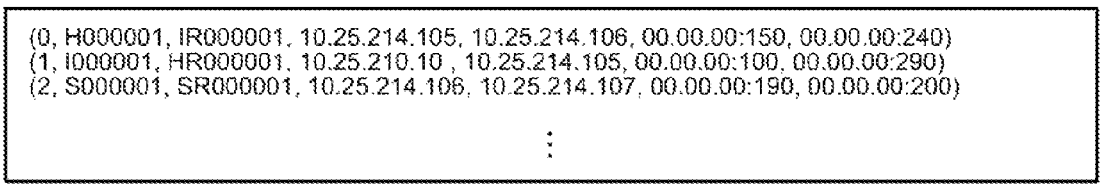
FIG. 3 is a diagram illustrating one example of data observed.

Preferred embodiments of the present invention will be explained with reference to accompanying drawings.

[a] First Embodiment

In a first embodiment, an example of a model generating device is described by using FIG. 1. FIG. 1 is a diagram illustrating the model generating device according to the first embodiment.

As illustrated in FIG. 1, a model generating device 1 is connected to a network to which a plurality of information processing devices are connected that execute a plurality of events in a hierarchical structure. The model generating device 1 includes an acquiring unit 2, an assuming unit 3, a searching unit 4, an updating unit 5, and a generating unit 6.

The acquiring unit 2 observes information flowing through the network, and acquires event information including a time when execution of an event is started, a time when execution of the event is finished, and the type of the event. Based on the event information acquired by the acquiring unit 2, the assuming unit 3 assumes model candidates each indicating a relationship between an event and another event triggered by the former event, and makes a combination of the assumed model candidates. The searching unit 4 searches the model candidates assumed by the assuming unit 3 for a candidate that matches an existing model. The updating unit 5 withdraws the model candidate searched for by the searching unit 4 from the combination of the assumed model candidates. The updating unit 5 also withdraws a candidate that is to be withdrawn from the combination of the model candidates in association with withdrawal of the model candidate found as a result of the search, thereby updating the combination of the model candidates. The generating unit 6 generates a new model on the basis of the combination of the model candidates updated by the updating unit 5.

As described above, the model generating device 1 assumes model candidates, and makes a combination of the assumed model candidates. Then, the model generating device 1 searches the assumed model candidates for a model candidate that matches an existing model. The model generating device 1 withdraws the model candidate matching the existing model from the combination of the model candidates. The model generating device 1 also withdraws a candidate that is to be withdrawn from the combination of the model candidates in association with withdrawal of the model candidate found as a result of the search, thereby updating the combination of the model candidates. The model generating device 1 thereafter generates a new model by using the updated combination of the model candidates. That is, the model generating device 1 deletes one of the model candidates that matches the existing model from new model candidates. Thus, the model generating device 1 can generate a model as the model generating device 1 can simplify a candidate even if a large number of events are executed at the same time and a combination of assumed model candidates is complex.

[b] Second Embodiment

Next, a model generating device will be described in a second embodiment.

A model generating device according to the second embodiment is described first by using FIG. 2. FIG. 2 is a diagram illustrating the model generating device according to the second embodiment. In the example illustrated in FIG. 2, a model generating device 10 includes an observed data storage 11, a model data storage 12, a classified model data storage 13, an input unit 14, a model generating unit 15, a matching unit 16, and an output unit 17.

The model generating device 10 is connected to a network to which a plurality of information processing devices are connected that execute a plurality of events in a hierarchical structure. The model generating device 10 is also connected to a client terminal 18.

The observed data storage 11 stores event information data including a time when execution of an event is started by an information processing device, a time when execution of the event is finished by the information processing device, and the type of the event. More specifically, the observed data storage 11 stores data that is information indicating an event executed. The data contains the name of the event, a label, and the IP address of an information processing device that executed the event (hereinafter called IP of source of request), with these items being associated with each other. The observed data storage 11 also stores data containing the IP address of an information processing device to execute a different event triggered by the event already executed (hereinafter called IP of destination of request), a time when execution of the different event is started, and a time when execution of the different event is finished, with these items being associated with each other. A label mentioned here is information indicating the type of an event.

For example, in the example illustrated in FIG. 3, the observed data storage 11 stores labels "I000000" and "HR000001" as the data about an event named as "1". The observed data storage 11 also stores, as the data about the data ID "1", the IP address "10.25.210.10" of an information processing device having executed the event.

The observed data storage 11 also stores, as the data about the event named as "1", the IP address "10.25.214.105" of an information processing device to execute a different event triggered by the event already executed. The observed data storage 11 further stores, as the data about the event named as "1", a time "00.00.00:100" when the event is started, and a time "00.00.00:290" when the event is finished.

Returning to FIG. 2, the model data storage 12 stores a model generated by the model generating unit 15 described later. For example, the model data storage 12 stores a model indicating that an event labeled as "H1" triggers an event labeled as "I1". In the description below, an event that triggers a different event is called a master event, and an event triggered by a different event is called a slave event.

The classified model data storage 13 stores data indicating events in a model candidate that matches an existing model. As described later, if a candidate matching an existing model is a candidate to be deleted, the matching unit 16 stores data indicating events in this candidate into the classified model data storage 13. That is, the classified model data storage 13 stores data indicating events deleted by the matching unit 16 described later.

The input unit 14 observes information flowing through the network to which the plurality of information processing devices are connected that execute a plurality of events in a hierarchical structure. Then, the input unit 14 acquires event information including a time when execution of an event is started, a time when execution of the event is finished, and the type of the event.

More specifically, the input unit 14 observes packets going through the network, and acquires information about an event executed by each information processing device on the basis of the observed packets. Then, the input unit 14 stores the acquired information about the event into the observed data storage 11.

Figure 4:
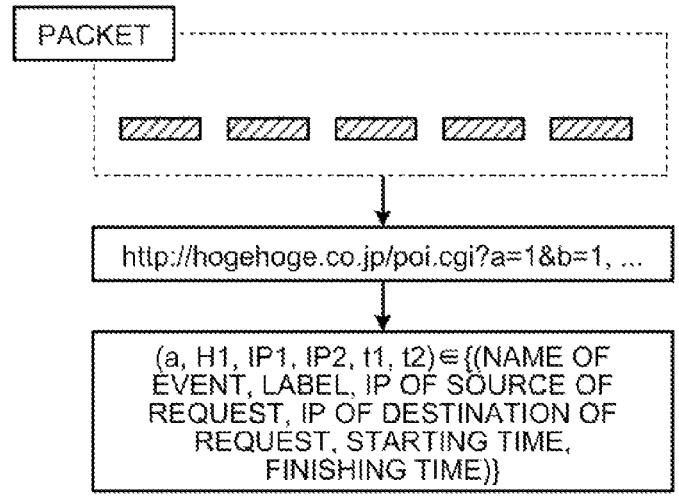
FIG. 4 is a diagram illustrating a process for acquiring a relationship from packets.

A process performed by the input unit 14 will be described next by using FIG. 4. FIG. 4 illustrates a process to acquire a relationship from packets. In the example illustrated in FIG. 4, the input unit 14 restores "http://hogehoge.co.jp/poi.cgi?a=1&b=1", which is a request for execution of a process, from a plurality of packets. Next, based on the restored request for execution, the input unit 14 generates data containing the name of an event, a label, the IP of source of request of the event, the IP of destination of request of the event, a time when execution of the event is started, and a time when execution of the event is finished. The input unit 14 thereafter stores the generated data into the observed data storage 11.

As described, the input unit 14 observes packets going through the working network, and acquires information about an event executed by each information processing device based on the observed packets. Thus, the model generating device 10 can acquire information about an event executed while the network is in a normal condition without the need to stop a service provided by the network.

Returning to FIG. 2, the model generating unit 15 generates a new model on the basis of a combination of model candidates updated by the matching unit 16 described later. More specifically, the model generating unit 15 generates a model by reading data stored in the observed data storage 11. The model generating unit 15 also stores the generated model into the model data storage 12. The model generating unit 15 stores data used for model generation, and which is part of the data read from the observed data storage 11, into the classified model data storage 13. The model generating unit 15 returns data not used for model generation, and which is part of the data read from the observed data storage 11, to the observed data storage 11.

The matching unit 16 reads data stored in the observed data storage 11 and a model stored in the model data storage 12. Next, the matching unit 16 compares the read model with the read data. Then, the matching unit 16 stores the read data into the classified model data storage 13 if the read data matches the read model. The matching unit 16 returns the read data to the observed data storage 11 if the read data does not match the read model.

A process performed by the matching unit 16 will be described in detail below. First, the matching unit 16 reads data stored in the observed data storage 11 and a model stored in the model data storage 12. Next, the matching unit 16 assumes model candidates on the basis of data acquired by the input unit 14, and makes a combination of the assumed model candidates. The matching unit 16 searches the assumed model candidates for a candidate that matches an existing model.

Next, the matching unit 16 determines whether events in the matching candidate (first candidate) include a slave event that is also contained in a different second candidate. If determining that the slave event is also contained in the second candidate, the matching unit 16 searches for a third candidate containing a master event that is also contained in the second candidate. Then, the matching unit 16 determines whether the third candidate searched for matches the existing model. If determining that the third candidate searched for matches the existing model, the matching unit 16 determines that the events in the first candidate can be deleted.

That is, the matching unit 16 determines whether there will be an event that is left out of a model candidate as a result of withdrawal of a model candidate searched for from a combination of model candidates, and withdrawal of a candidate that is to be withdrawn from the combination of the model candidates in association with withdrawal of the model candidate found as a result of the search.

If determining that the third candidate searched for does not match the existing model, the matching unit 16 detects candidates each containing events the combination of which is the same as the types of the events in the second candidate. Then, the matching unit 16 counts the number of events contained as master events in the detected candidate. The matching unit 16 also calculates a value obtained by dividing the counted number of events by the number of times an event of the same type as that of a master event in a matching candidate was executed. The matching unit 16 thereafter determines whether the calculated value is lower than a predetermined threshold. If determining that the calculated value is lower than the threshold, the matching unit 16 determines that events in the matching candidate can be deleted.

That is, the matching unit 16 calculates a possibility for the candidate, that is to be withdrawn from the combination of the model candidates in association with withdrawal of the model candidate found as a result of the search, to be established as a model. If the calculated possibility is lower than a predetermined threshold, the matching unit 16 determines that the candidate that is to be withdrawn from the combination of the model candidates in association with withdrawal of the model candidate found as a result of the search can be deleted.

The matching unit 16 thereafter stores data indicating events determined as deletable into the classified model data storage 13, and stores the other data into the observed data storage 11. That is, the matching unit 16 deletes the candidate to be withdrawn from the combination of the model candidates in association with withdrawal of the model candidate found as a result of the search, and the model candidate searched for.

Under the condition that a problem such as an error is not generated, each information processing device is considered to execute the same events as those in an existing model. Thus, even if events in a candidate matching an existing model are to be deleted, the matching unit 16 will not delete a relationship between events that is to be specified as a new model. As a result, the model generating unit 15 can generate a new model by using appropriate candidates.

When comparing an assumed candidate with an existing model, the matching unit 16 may employ a publicly known algorithm such as the greedy algorithm. In this case, matching is performed in such a way that a possibility supposed to be correct in light of all assumed candidates is made maximum.

The output unit 17 outputs a model stored in the model data storage 12 to the client terminal 18. For example, the output unit 17 outputs a model indicating that an event labeled as "H1" triggered an event labeled as "I1".

Processes by Model Generating Device

Figure 5:
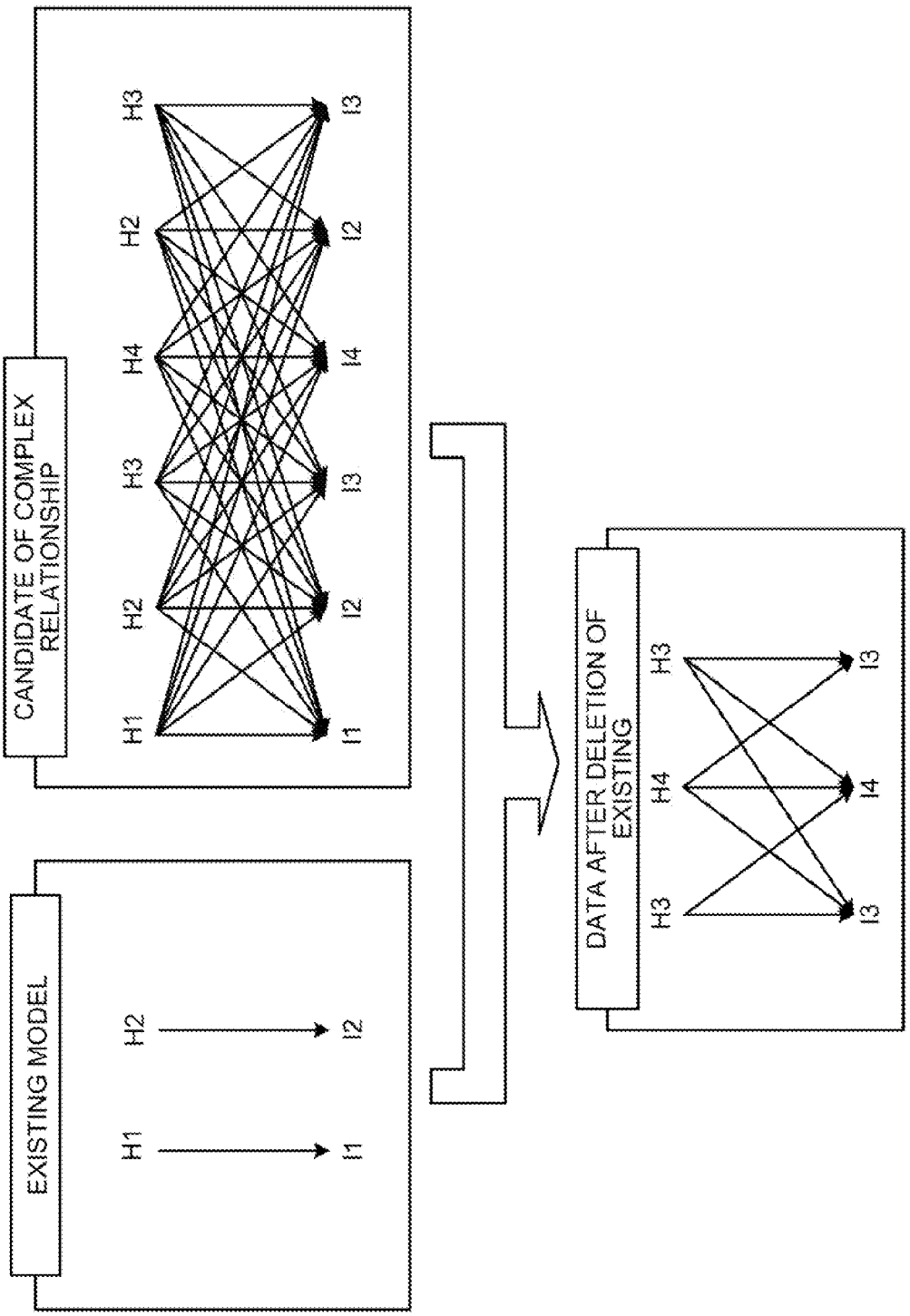
FIG. 5 is a diagram illustrating an idea of a process performed by the model generating device.

Specific examples of processes performed by the model generating device 10 will be described next by using the drawings. An idea of the processes performed by the model generating device 10 will be described first by using FIG. 5. FIG. 5 is a diagram illustrating an idea of the processes performed by the model generating device. In the example illustrated in FIG. 5, the model generating device 10 stores a model as an existing model indicating that an event labeled as "H1" causes an event labeled as "I1". The model generating device 10 also stores a model as an existing model indicating that an event labeled as "H2" causes an event labeled as "I2".

As illustrated in FIG. 5, the model generating device 10 assumes complex model candidates. In this example, the model generating device 10 searches the assumed candidates for a candidate containing an event labeled as "H1" and an event labeled as "I1" that are also contained in the existing model. The model generating device 10 also searches for a candidate containing an event labeled as "H2" and an event labeled as "I2". Then, the model generating device 10 deletes data indicating the events in the candidates searched for. That is, the model generating device 10 compares an existing model with a model candidate, and deletes the model candidate if the model candidate matches the existing model.

As a result, simplified model candidates remain as seen from data after deletion of the existing models illustrated in FIG. 5. The model generating device 10 thereafter specifies a new model that is one of the remaining model candidates.

Figure 6:
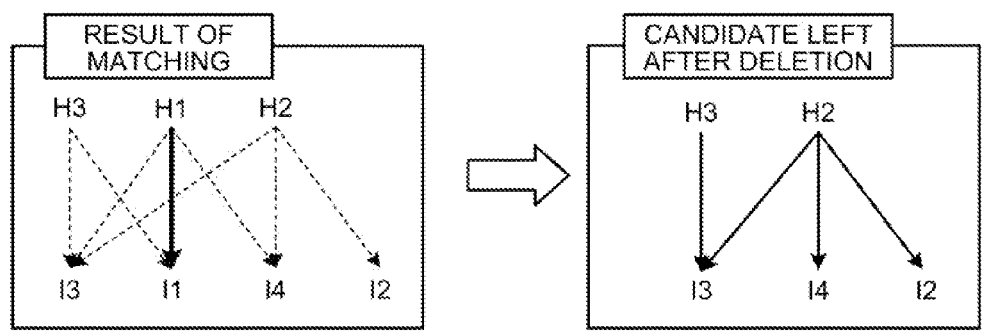
FIG. 6 is a diagram illustrating deletion of a candidate based on a result of matching.

Deletion of a candidate based on a result of matching will be described next by using FIG. 6. FIG. 6 is a diagram illustrating deletion of a candidate based on a result of matching. In the example illustrated in FIG. 6, assumed candidates and an existing model are compared with each other. Then, a candidate containing an event labeled as "H1" and an event labeled as "I3", and a candidate containing an event labeled as "H1" and an event labeled as "I4" are deleted. As a result, compared to those before deletion, candidates left after the deletion are simplified as illustrated in FIG. 6.

Figure 7:
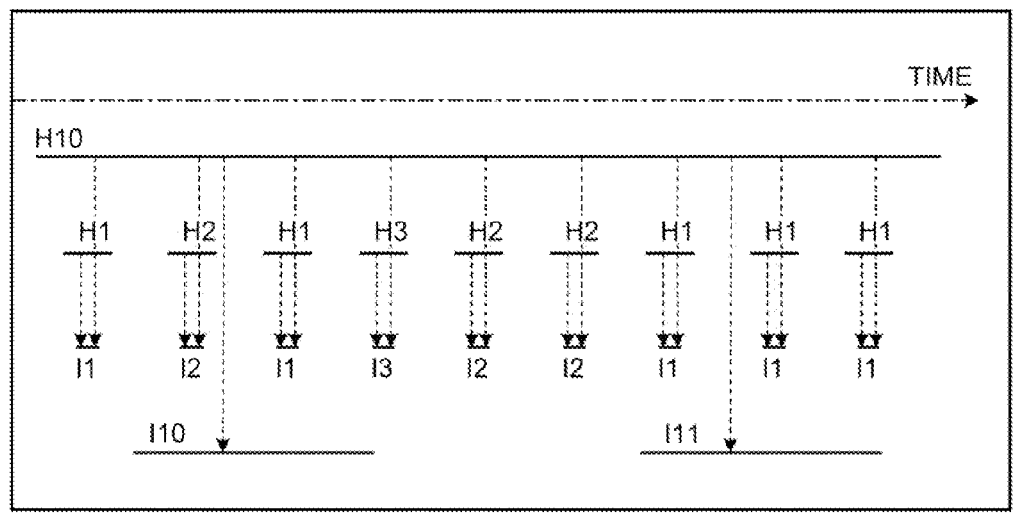
FIG. 7 is a diagram illustrating a model candidate containing an extremely long event.
Figure 8:
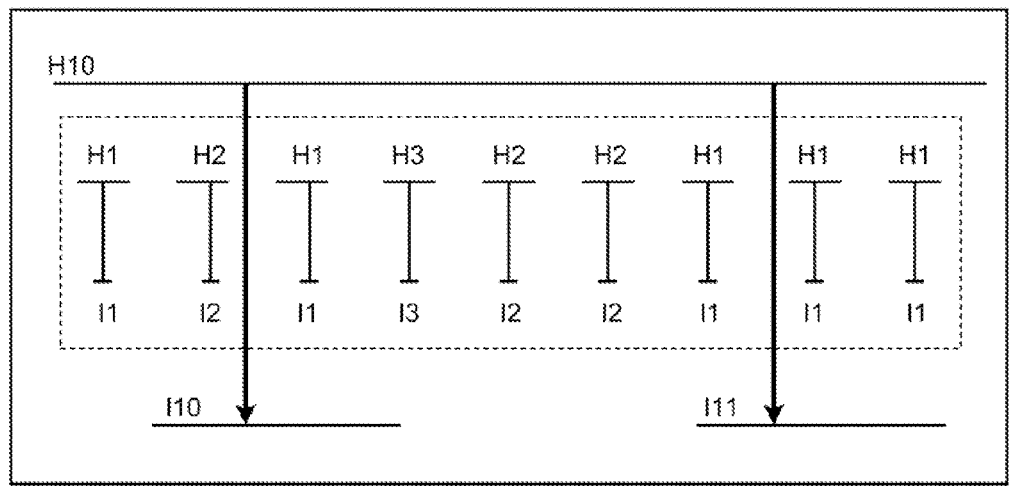
FIG. 8 is a diagram illustrating data after a candidate is deleted on the basis of an existing model.

It is described by using FIGS. 7 and 8 how simplification of a candidate realized by deleting a candidate matching an existing model works effectively. FIG. 7 is a diagram illustrating a model candidate containing an extremely long event.

FIG. 8 is a diagram illustrating data after a candidate is deleted on the basis of the existing model.

In the description below, the model generating device 10 stores, as existing models, a model containing an event labeled as "H1" and an event labeled as "I1", and a model containing an event labeled as "H2" and an event labeled as "I2". The model generating device 10 also stores a model containing an event labeled as "H3" and an event labeled as "I3" as an existing model.

An extremely long event labeled as "H10" occurs in the example illustrated in FIG. 7. This makes it difficult to specify an event triggered by the event labeled as "H10". In this case, the model generating device 10 compares model candidates indicated by dotted lines in FIG. 7 with the stored existing models, so that candidates surrounded by dotted lines in FIG. 8 can be deleted. As a result, the model generating device 10 can generate a model indicating that the event labeled as "H10" triggered an event labeled as "I10" and an event labeled as "I11".

Figure 9:
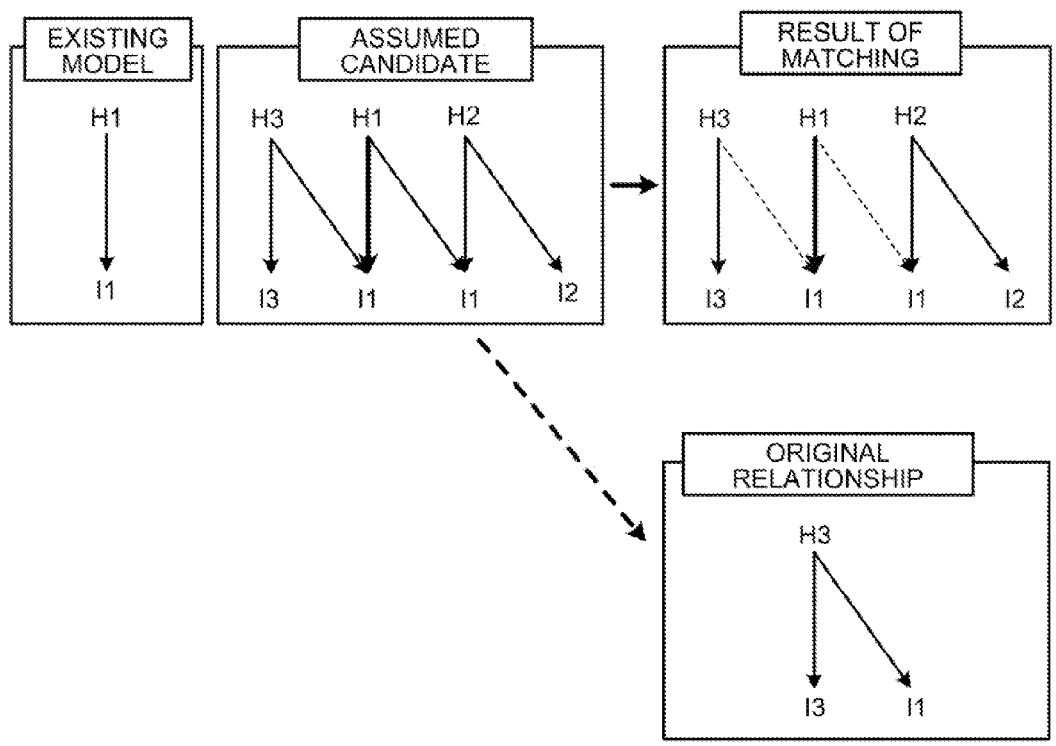
FIG. 9 is a diagram illustrating a false matching process.

False matching will be described next by using FIG. 9. FIG. 9 is a diagram illustrating a false matching process. The example illustrated in FIG. 9 is on the condition that an event labeled as "H3" originally triggers an event labeled as "I3" and an event labeled as "I1". If only a candidate matching an existing model is deleted as illustrated in FIG. 9, it is assumed that the event labeled as "H1" generated the event labeled as "I1". In this case, the model generating device 10 deletes the events in the candidate. Accordingly, if only a candidate matching the existing model is simply deleted, the model generating device 10 precludes a possibility that the event labeled as "H3" triggered the event labeled as "I3".

In order to avoid this failure, if an existing model and an assumed candidate match each other, the model generating device 10 determines whether the matching candidate satisfies a predetermined requirement. If determining that the matching candidate satisfies the predetermined requirement, the model generating device 10 deletes events in the candidate.

More specifically, the model generating device 10 determines whether events in the matching candidate (first candidate) include a slave event that is also contained in a different second candidate. If determining that the slave event is also contained in the second candidate, the model generating device 10 searches for a third candidate containing a master event that is also contained in the second candidate. Then, the model generating device 10 determines whether the third candidate searched for matches the existing model. If determining that the third candidate searched for matches the existing model, the model generating device 10 deletes the events in the first candidate.

The model generating device 10 also calculates a possibility for the slave event in the matching candidate to have been triggered by a master event in a different candidate. The model generating device 10 deletes the events in the matching candidate only if the calculated possibility is lower than a predetermined threshold. If the possibility for the slave event in the matching candidate to have been triggered by the master event in the different candidate is higher than the predetermined threshold, the model generating device 10 does not delete the events in the first candidate, and finishes the matching process.

Figure 10:
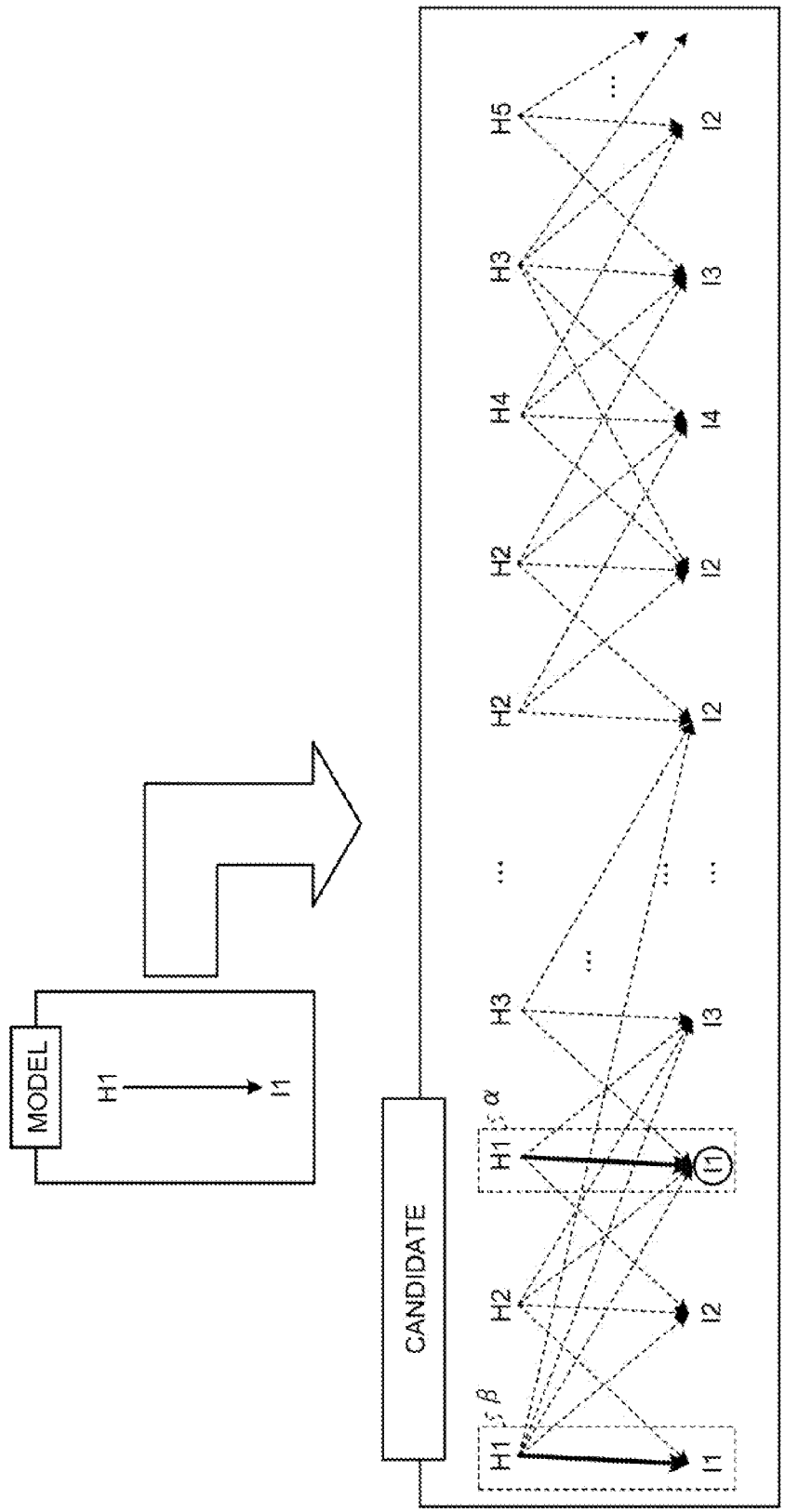
FIG. 10 is a diagram illustrating an example of deletion of a candidate on the basis of a matching result.

For example, in the example illustrated in FIG. 10, the model generating device 10 compares model candidates with a model indicating that an event labeled as "H1" triggered an event labeled as "I1". Then, the model generating device 10 determines that a first candidate identified as α matches the model. Accordingly, the model generating device 10 searches for a second candidate containing a circled event labeled as "I1". Then, the model generating device 10 determines whether a third candidate containing a master event that is also contained in the candidate searched for matches the existing model. FIG. 10 is a diagram illustrating an example of deletion of a candidate based on a matching result.

The example illustrated in FIG. 10 includes the third candidate identified as β that contains an event labeled as "H1" and an event labeled as "I1". Accordingly, the model generating device 10 deletes the events in the first candidate identified as α in FIG. 10. The model generating device 10 performs the same process on the candidate identified as β in FIG. 10.

Figure 11:
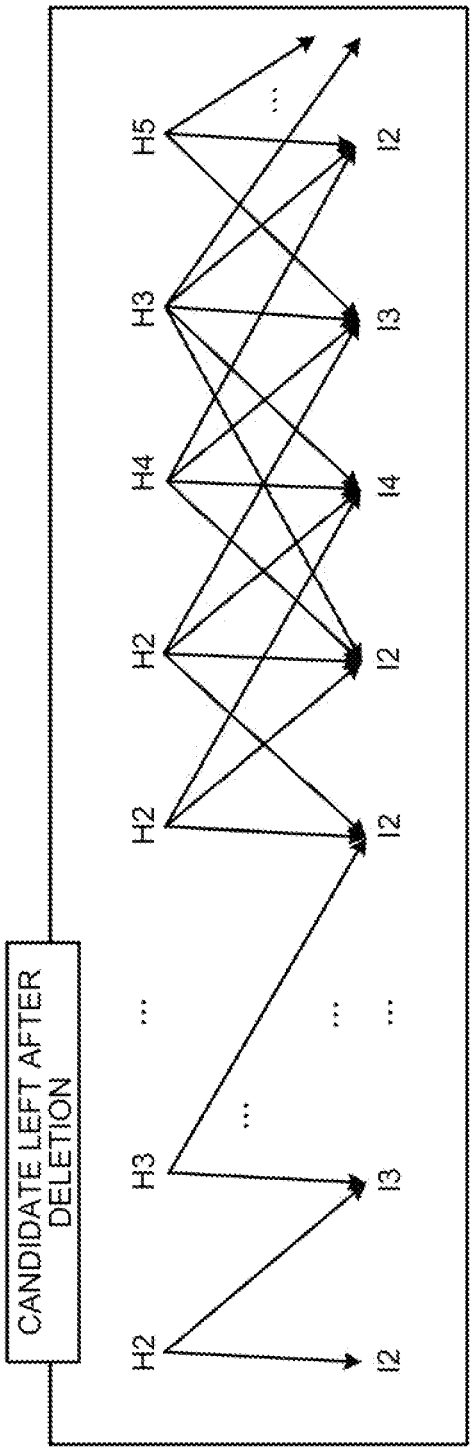
FIG. 11 is a diagram illustrating a result of deletion after candidates are deleted on the basis of a matching result.

As a result, the model generating device 10 deletes the events in the candidates identified as α and β in FIG. 10, thereby acquiring candidates illustrated in FIG. 11. The model generating device 10 does not delete the events in the first candidate if the third candidate does not match the existing model. This avoids generation of an event that fails to form a relationship with a different event. FIG. 11 is a diagram illustrating a result of deletion after candidates are deleted based on a matching result.

Figure 12:
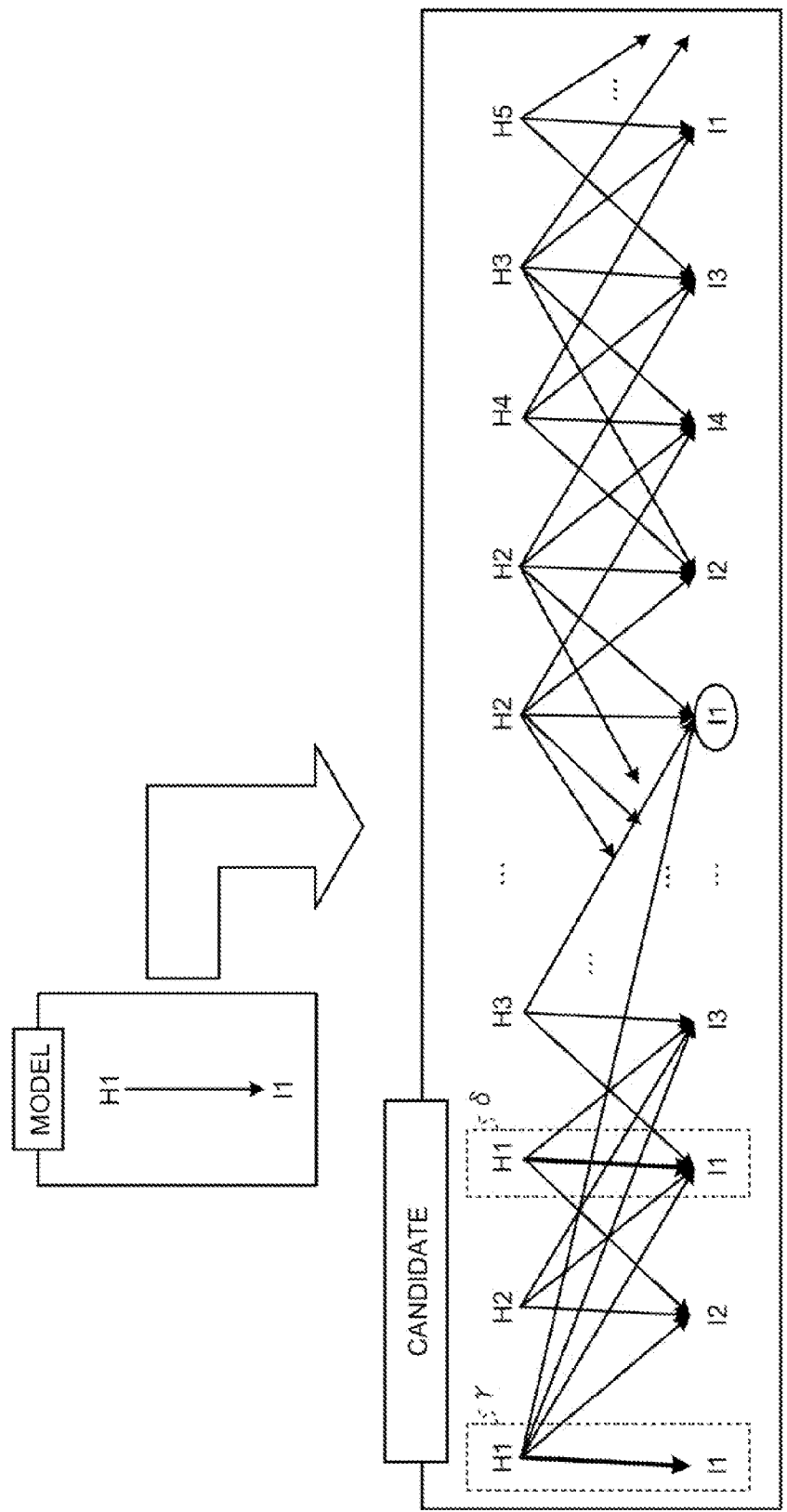
FIG. 12 is a diagram illustrating an example where a candidate cannot be deleted on the basis of a result of matching.

In an example described next by using FIG. 12, a candidate cannot be deleted on the basis of a result of matching. FIG. 12 is a diagram illustrating an example where a candidate cannot be deleted on the basis of a result of matching. In the example illustrated in FIG. 12, the model generating device 10 determines as a result of matching that candidates identified as γ and δ in FIG. 12 match each other.

An event labeled as "H1" in the candidate identified as γ in FIG. 12 may have triggered a circled event labeled as "I1" in FIG. 12. However, each of candidates containing the circled event labeled as "I1" in FIG. 12 does not match an existing model. In this case, the model generating device 10 does not delete the events in the candidate identified as γ in FIG. 12, and deletes only the events in the candidate identified as δ in FIG. 12.

Figure 13:
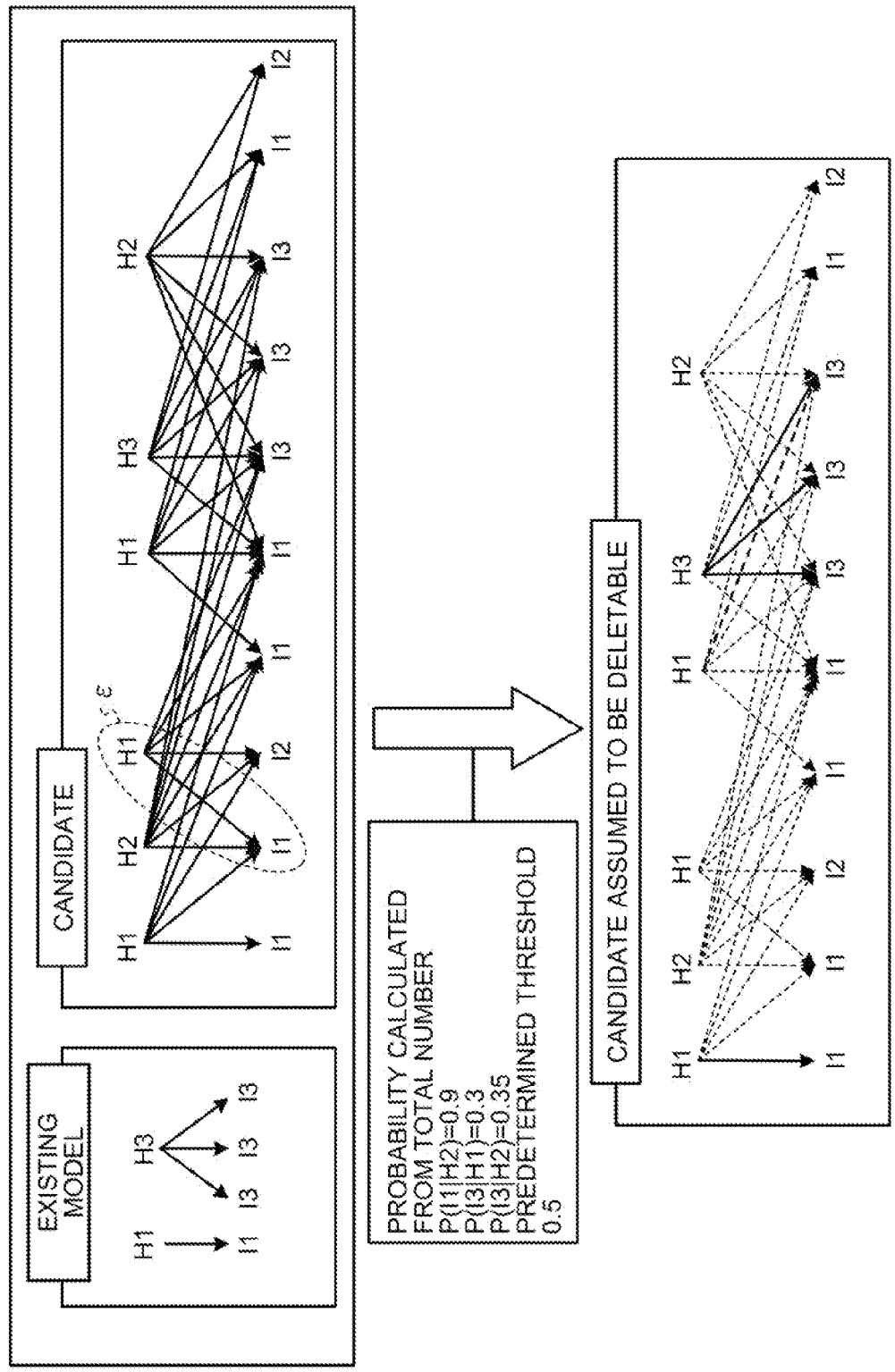
FIG. 13 is a diagram illustrating an example where a candidate is deleted in consideration of a frequency of appearance.

In a process described next by using FIG. 13 that is one of processes performed by the model generating device 10, events in a matching candidate are deleted only if a slave event in the matching candidate is also contained in a different candidate with a low frequency. FIG. 13 is a diagram illustrating an example where a candidate is deleted in consideration of a frequency of appearance.

In the example illustrated in FIG. 13, the model generating device 10 stores, as an existing model, an acquired model indicating that an event labeled as "H1" triggers an event labeled as "I1". The model generating device 10 also stores as an existing model a model indicating that an event labeled as "H3" triggers an event labeled as "I3" three times.

In this example, the model generating device 10 determines that a candidate identified as ε illustrated in FIG. 13 matches the model. A slave event labeled as "I1" in the candidate ε in FIG. 13 is also contained in a candidate containing an event labeled as "H2" as its master event. In the example illustrated in FIG. 13, a value obtained by dividing the number of events labeled as "H2" assumed to trigger the event labeled as "I1" by the total number of the events labeled as "H2" is "0.9" that is greater than a predetermined threshold "0.5". Namely, in the example illustrated in FIG. 13, it is quite likely that the event labeled as "I1" will be triggered by the event labeled as "H2". Accordingly, the model generating device 10 does not delete the events in the candidate ε in FIG. 13.

Figure 14:
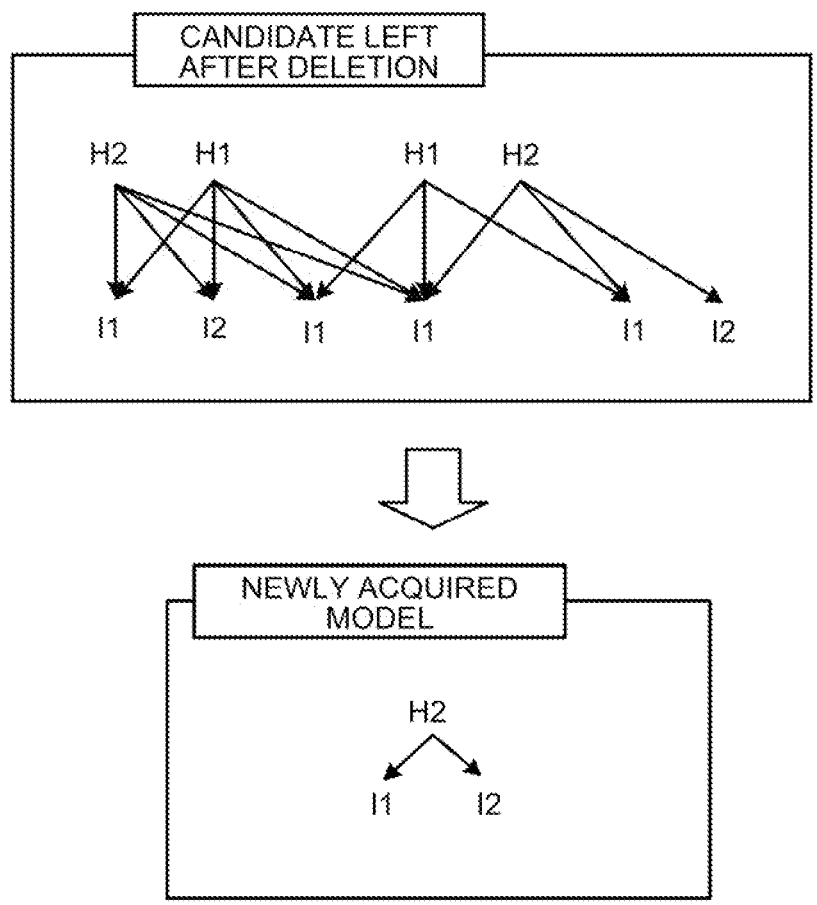
FIG. 14 is a diagram illustrating a process to specify a model by using candidates left after deletion.

The model generating device 10 performs the same process, so that only those events in candidates indicated by solid lines in the drawing of candidates in FIG. 13 illustrating candidates assumed to be deletable. As a result, the model generating device 10 acquires candidates left after deletion illustrated in FIG. 14. The model generating device 10 thereafter generates a model from the acquired candidates to specify a model indicating that an event labeled as "H2" triggers an event labeled as "I1" and an event labeled as "I2". FIG. 14 is a diagram illustrating a process to specify a model using candidates left after deletion.

Figure 15:
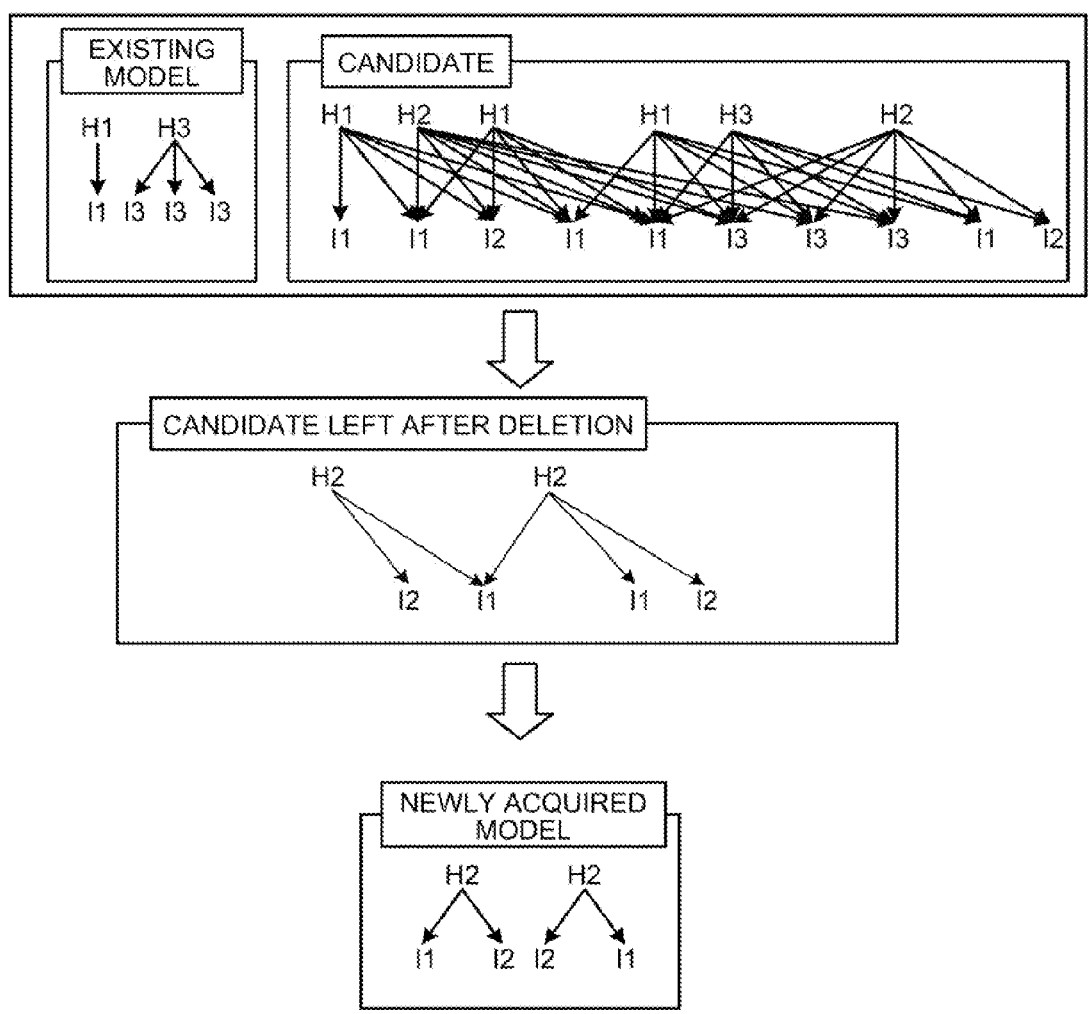
FIG. 15 is a diagram illustrating an example where a candidate is deleted without consideration of a frequency of appearance.

In an example described next by using FIG. 15, a candidate is deleted without consideration of a frequency of appearance. FIG. 15 is a diagram illustrating an example where a candidate is deleted without consideration of a frequency of appearance. In the example illustrated in FIG. 15, the model generating device 10 compares existing models and candidates, and deletes events in the matching candidates.

As a result, in the example illustrated in FIG. 15, the model generating device 10 specifies, as a newly acquired model, a model indicating that an event labeled as "H2" triggered an event labeled as "I1" and an event labeled as "I2". The model generating device 10 also specifies a model indicating that an event labeled as "H2" triggered an event labeled as "I2" and an event labeled as "I1".

However, it is unlikely in a usual process that each time an event labeled as "H2" is executed, the event labeled as "H2" may trigger events in different orders. More specifically, in the example illustrated in FIG. 15, candidates are deleted without consideration of a frequency of appearance. In this case, a false model will be specified. In response, the model generating device 10 deletes a candidate in consideration of the frequency of appearance of a candidate containing a slave event that is also contained in a matching candidate.

Processing of Model Generating Device

Figure 16:
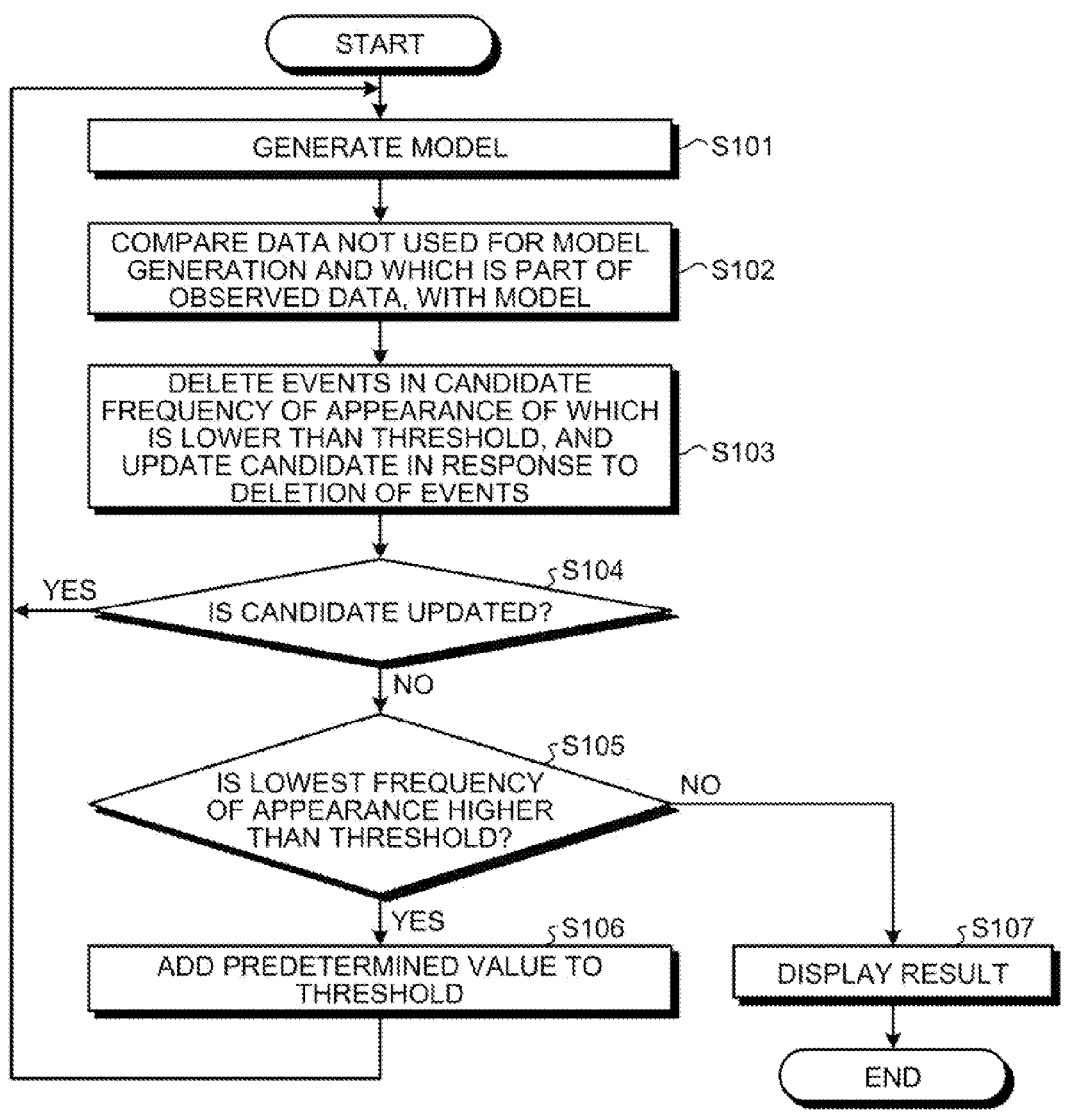
FIG. 16 is a flow chart for describing a flow of model generating processes.

A flow of the processes performed by the model generating device 10 will be described next by using FIG. 16. FIG. 16 is a flow chart for explaining a flow of the model generating processes. In the example illustrated in FIG. 16, the model generating device 10 starts processing in response to power-on.

First, the model generating device 10 generates a model by using data that is part of acquired data (step S101). The data used here covers a range where the number of events occurring at the same time is small. Next, the model generating device 10 compares data not used for model generation with the model generated in step S101 (step S102).

If a slave event in a candidate matching the model is also contained in a candidate the frequency of appearance of which is lower than a threshold, the model generating device 10 deletes data indicating events in the matching candidate to update candidates (step S103). Next, the model generating device 10 determines whether the candidates are updated (step S104). That is, the model generating device 10 determines whether the data indicating the events in the matching candidate is deleted. If determining that the candidates are updated (Yes of step S104), the model generating device 10 specifies a new model on the basis of a relationship between the updated candidates (step S101).

If the candidates are not updated (No of step S104), the model generating device 10 determines whether a lowest frequency of appearance is higher than the threshold (step S105). If determining that the lowest frequency of appearance is higher than the threshold (Yes of step S105), the model generating device 10 adds a predetermined value to the threshold (step S106), and specifies a model again (step S101). If determining that the lowest frequency of appearance is smaller than the threshold (No of step S105), the model generating device 10 displays the specified model on the client terminal 18 (step S107), and thereafter finishes the processing.

Effect of Second Embodiment

As described above, the model generating device 10 according to the second embodiment assumes model candidates each indicating a relationship between an event and another event triggered by the former event on the basis of information indicating a time period during which each information processing device executed an event. Then, the model generating device 10 compares the assumed candidates with an existing model, and deletes a candidate containing events that are also contained in a candidate matching the existing model. The model generating device 10 thereafter specifies a new model that is one of those assumed candidates left without being deleted.

This means that the model generating device 10 simplifies the assumed candidates by using the existing model. Accordingly, the model generating device 10 can generate a model even if a large number of events are executed at the same time and the assumed candidates are complex.

The model generating device 10 determines whether a slave event in the candidate matching the existing model is also contained in a different candidate. If determining that this slave event is also contained in the different candidate, the model generating device 10 determines whether a possibility for the slave event to have been triggered by a master event in the different candidate is lower than a predetermined threshold. If determining that the possibility for the slave event to have been triggered by the master event in the different candidate is lower than the predetermined threshold, the model generating device 10 deletes the events in the matching candidate. Thus, the model generating device 10 can simplify the assumed candidates appropriately. The model generating device 10 can also generate a more precise model.

If the candidate matching the existing model cannot be deleted, the model generating device 10 defines a new threshold by adding a predetermined value to the predetermined threshold. If a possibility for the slave event to have been triggered by the master event in the different candidate is lower than the new threshold, the model generating device 10 deletes the events in the matching candidate. This means that the model generating device 10 can gradually change the reliability level of a model to be specified.

The model generating device 10 also determines whether the slave event of the events in the matching candidate (first candidate) is also contained in a different second candidate. If determining that the slave event is also contained in the second candidate, the model generating device 10 searches for a third candidate containing a master event that is also contained in the second candidate. Then, the model generating device 10 determines whether the third candidate searched for matches the existing model. If determining that the third candidate searched for matches the existing model, the model generating device 10 deletes the events in the first candidate.

Accordingly, the model generating device 10 can delete events more appropriately. To be specific, the model generating device 10 can avoid a situation where an event failing to form a relationship with a different event remains as a result of simple deletion of the events in the matching candidate.

[c] Third Embodiment

While the embodiments of the present invention have been described above, the invention may be implemented in different modes other than the aforementioned embodiments. A third embodiment that is a different embodiment that is encompassed by the invention will be described below.

(1) Each Section of Model Generating Device

The model generating device 10 according to the second embodiment described above includes the model generating unit 15 and the matching unit 16. Data stored in the observed data storage 11 is transferred to the different storage 12 or 13 so as to specify a model, and delete events in a candidate matching a model, to which the invention is not limited.

For example, a model generating device 10a according to the third embodiment generates information indicating model candidates on the basis of data stored in the observed data storage 11, and compares the generated model candidates with an existing model. Then, the model generating device 10 deletes data indicating events in a candidate matching the existing model. After deleting the data indicating the events in the candidate matching the existing model, the model generating device 10a may generate candidates again, and specify a model that is one of the candidates generated again.

(2) Threshold

The second embodiment described above defines the predetermined threshold as "0.5", to which the embodiments are not limited. For example, in the model generating device 10a, a threshold may be increased gradually from its initial value of "0.1". This allows the model generating device 10a to acquire a model of a reliability level highest of those of models that may be specified.

To be specific, if a combination of model candidates is not updated, the model generating device 10a calculates a new threshold, and calculates a possibility for a candidate, that is to be withdrawn from the combination of the model candidates in association with withdrawal of a model candidate found as a result of search, to be established as a model. If the calculated possibility is higher than the new threshold, the model generating device 10a does not withdraw the model candidate, and the model candidate searched for from the combination of the assumed model candidates.

The model generating device 10a also calculates a possibility for a slave event in a matching candidate to have been triggered by a master event in a different candidate, for example. Then, the model generating device 10a may define the smallest value of the calculated possibility as p, and define a new threshold as $p+(1-p)/n$, where n is an arbitrary number.

(3) Model

In the second embodiment described above, the model generating device 10 generates a model with respect to a two-tier event containing master and slave events, to which the embodiments are not limited. For example, a model of events in a Web three-tier system may be generated. In this case, the model generating device 10a treats events in two upper tiers as one event, for example, thereby generating a model of events executed in the Web three-tier system.

(4) Program

Figure 17:
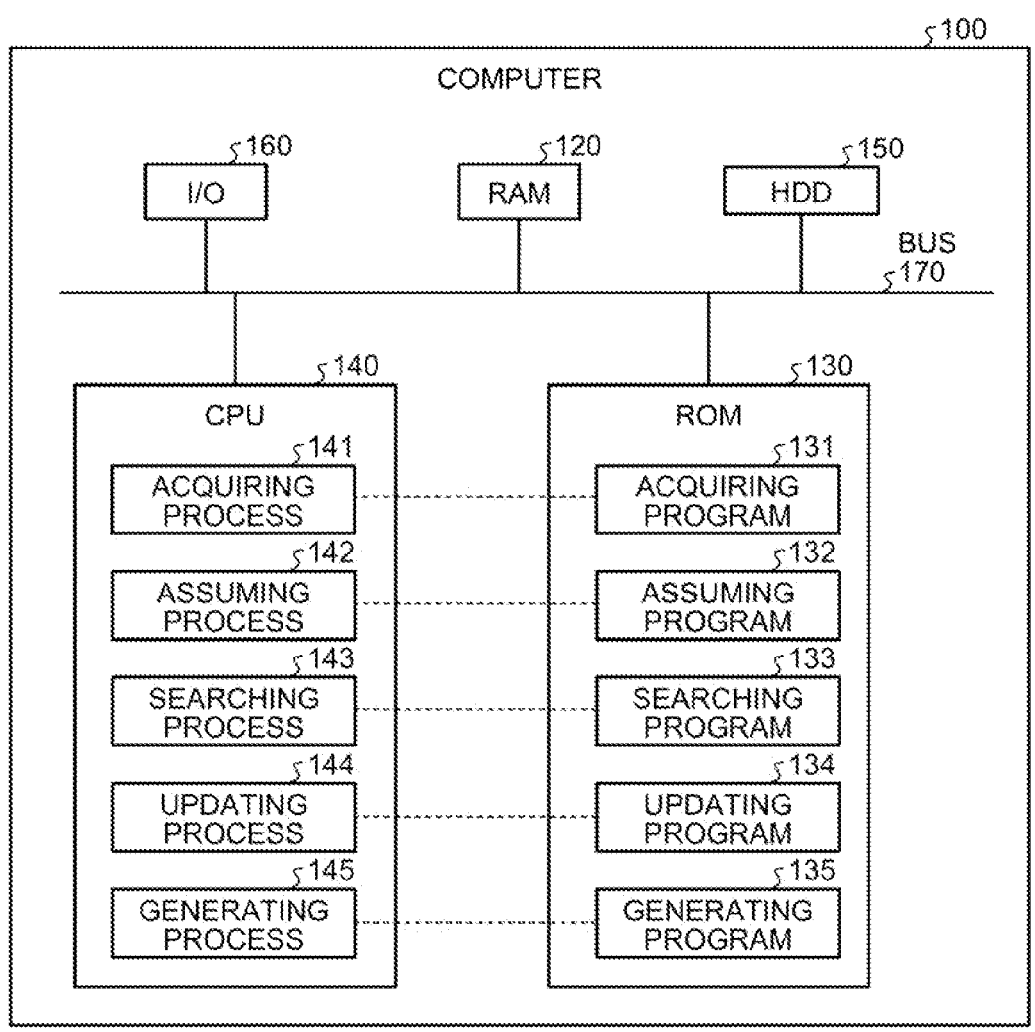
FIG. 17 is a diagram illustrating a computer that executes a model generating program.
Figure 18:
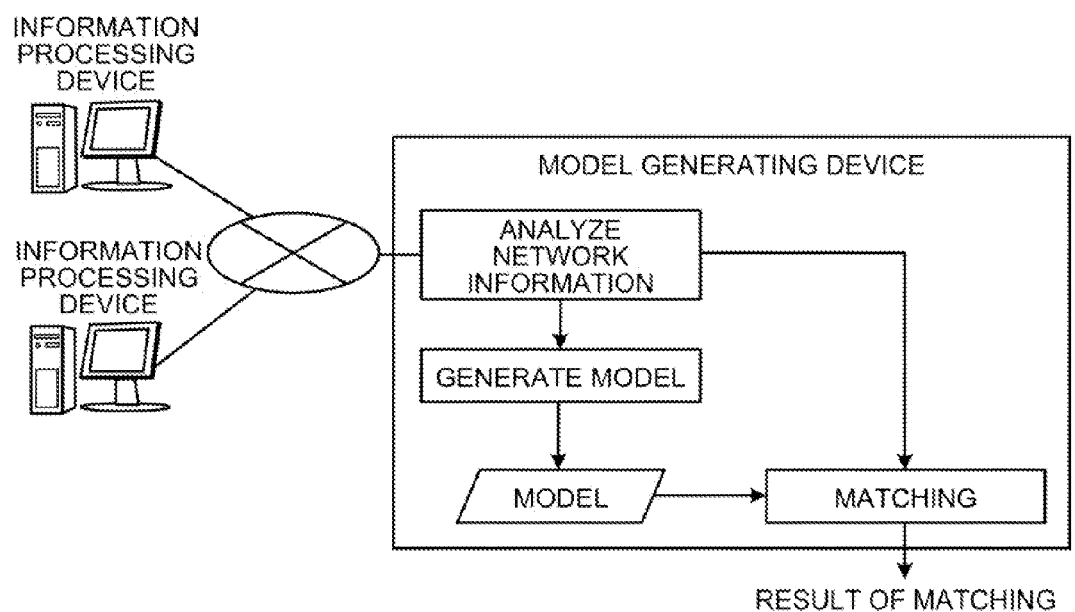
FIG. 18 is a diagram illustrating a model generating device.
Figure 19:
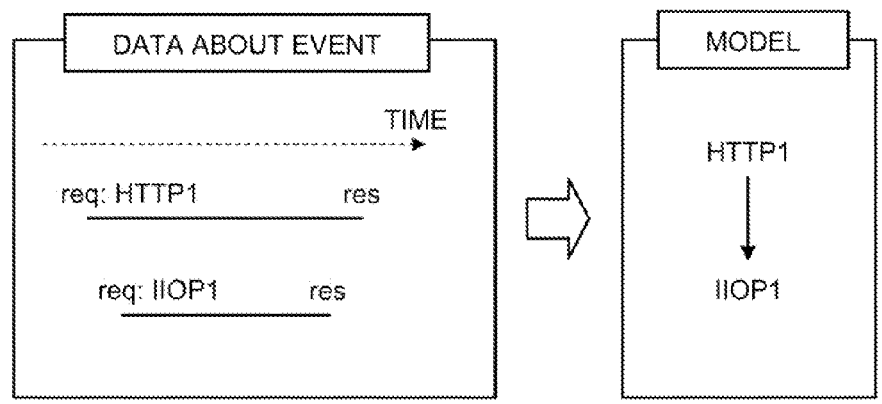
FIG. 19 is a diagram (1) illustrating a model.
Figure 20:
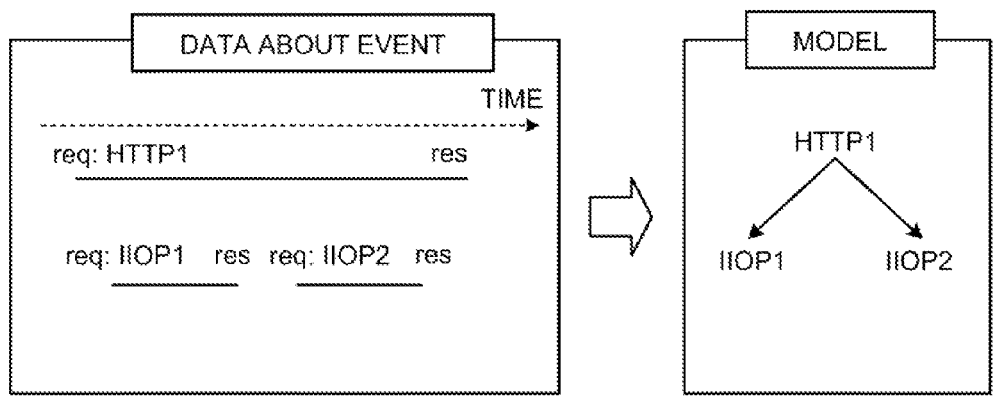
FIG. 20 is a diagram (2) illustrating a model.
Figure 21:
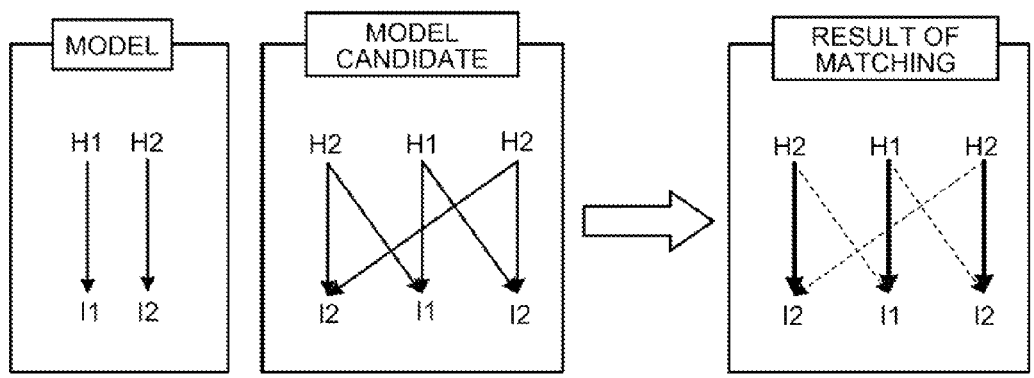
FIG. 21 is a diagram illustrating a matching process.
Figure 22:
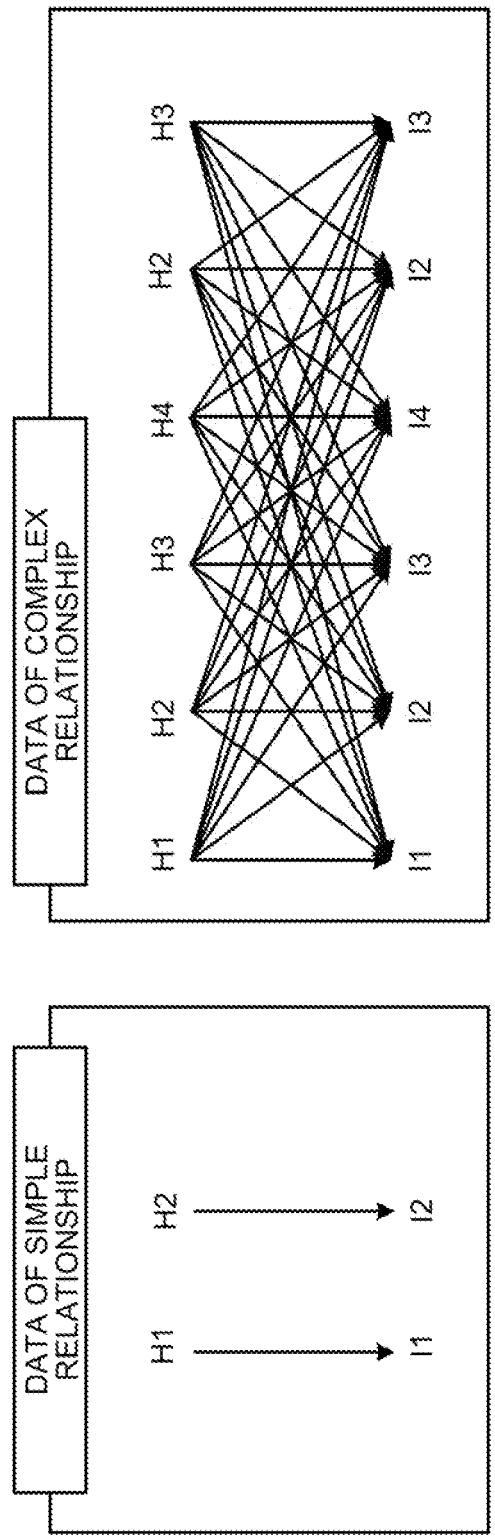
FIG. 22 is a diagram illustrating the volumes of relationships contained in data.

The model generating devices according to the first and second embodiments perform their processes in terms of hardware, to which the embodiments are not limited. These processes may be realized by causing a model generating device, or a computer operating as a model generating device to execute a previously prepared program. In the below, an example of a computer that executes a program having the same functions as those of the model generating device in the first embodiment will be described by using FIG. 17. FIG. 17 is a diagram illustrating a computer that executes a model generating program.

A computer 100 exemplified in FIG. 17 includes a RAM (random access memory) 120, a ROM (read only memory) 130, and a HDD (hard disk drive) 150, with these components being connected through a bus 170. The computer 100 exemplified in FIG. 17 also includes a CPU (central processing unit) 140 connected to the bus 170. An I/O (input output) 160 through which information flowing through a network is acquired is also connected to the bus 170.

An acquiring program 131, an assuming program 132, a searching program 133, an updating program 134, and a generating program 135 are stored in advance in the ROM 130. The CPU 140 reads the programs 131 to 135 from the ROM 130 and executes the read programs, by which the programs 131 to 135 become operative to realize an acquiring process 141, an assuming process 142, a searching process 143, an updating process 144, and a generating process 145, respectively, in the example illustrated in FIG. 17. The processes 141 to 145 have the same functions as those of the units 2 to 6 illustrated in FIG. 1, respectively. The processes 141 to 145 can also have the same functions as those of the corresponding units of the second embodiment, respectively.

The model generating program described in the present embodiment can be realized by causing a computer such as a personal computer and a work station to execute a previously prepared program. This program may be distributed through a network such as the Internet. Alternatively, this program may be stored in a computer-readable recording medium such as a hard disk, a flexible disk (FD), a CD-ROM (computer disk read only memory), an MO (magneto optical disc), and a DVD (digital versatile disc). In this case, the program may be executed after being read from the recording medium by a computer.

According to an aspect of the technique disclosed in the present invention, a model can be generated even if a large number of events are executed at the same time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A model generating device comprising:
    an acquiring unit that observes information flowing through a network to which a plurality of information processing devices are connected that execute a plurality of events in a hierarchical structure, the acquiring unit acquiring event information including a time when execution of an event is started, a time when execution of the event is finished, and a type of the event;
    an assuming unit that assumes model candidates each showing a relationship between an event and another event triggered by the former event on the basis of the event information acquired by the acquiring unit, and makes a combination of the assumed model candidates;
    a searching unit that searches the model candidates assumed by the assuming unit for a candidate that matches an existing model;
    an updating unit that withdraws the model candidate searched for by the searching unit from the combination of the model candidates, and withdraws a candidate that is to be withdrawn from the combination of the model candidates in association with withdrawal of the model candidate found as a result of the search, thereby updating the combination of the model candidates; and
    a generating unit that generates a new model on the basis of the combination of the model candidates updated by the updating unit.

2. The model generating device according to claim 1, wherein the updating unit calculates a possibility for the candidate, that is to be withdrawn from the combination of the model candidates in association with withdrawal of the model candidate found as a result of the search, to be established as a model, and
    if the calculated possibility is higher than a predetermined threshold, the updating unit does not withdraw the candidate to be withdrawn from the combination of the model candidates in association with withdrawal of the model candidate found as a result of the search, and the model candidate searched for by the searching unit from the combination of the model candidates assumed by the assuming unit.

3. The model generating device according to claim 2, wherein, if the combination of the model candidates is not updated, the updating unit defines a new threshold, and calculates a possibility for the candidate, that is to be withdrawn from the combination of the model candidates in association with withdrawal of the model candidate found as a result of search, to be established as a model, and
    if the calculated possibility is higher than the new threshold, the updating unit does not withdraw the model candidate, and the model candidate searched for by the searching unit from the combination of the model candidates assumed by the assuming unit.

4. The model generating device according to claim 1, wherein, if there will be an event that is left out of a model candidate as a result of withdrawal of the model candidate searched for by the searching unit from the combination of the model candidates, and as a result of withdrawal of the candidate that is to be withdrawn from the combination of the model candidates in association with withdrawal of the model candidate found as a result of the search, the updating unit does not withdraw a model candidate containing the event.

5. A computer-readable, non-transitory medium storing a model generating program causing a computer to execute a process, the computer observing information flowing through a network to which a plurality of information processing devices are connected that execute a plurality of events in a hierarchical structure, and generating a model indicating a relationship between an event and another event triggered by the former event, the process comprising:
    acquiring event information including a time when execution of an event is started, a time when execution of the event is finished, and the type of the event;
    assuming model candidates each showing a relationship between an event and another event triggered by the former event on the basis of the acquired event information, and making a combination of the assumed model candidates;
    searching the model candidates assumed at the assuming for a candidate that matches an existing model;
    withdrawing the model candidate searched for at the searching from the combination of the model candidates, and withdrawing a candidate that is to be withdrawn from the combination of the model candidates in association with withdrawal of the model candidate found as a result of the search, thereby updating the combination of the model candidates; and
    generating a new model on the basis of the combination of the model candidates updated at the updating.

6. A model generating method performed by a model generating device for observing information flowing through a network to which a plurality of information processing devices are connected that execute a plurality of events in a hierarchical structure, and generating a model indicating a relationship between an event and another event triggered by the former event, the method comprising:
    acquiring event information including a time when execution of an event is started, a time when execution of the event is finished, and the type of the event;
    assuming model candidates each showing a relationship between an event and another event triggered by the former event on the basis of the acquired event information, and making a combination of the assumed model candidates;
    searching the model candidates assumed at the assuming for a candidate that matches an existing model;
    withdrawing the model candidate searched for at the searching from the combination of the model candidates, and withdrawing a candidate that is to be withdrawn from the combination of the model candidates in association with withdrawal of the model candidate found as a result of the search, thereby updating the combination of the model candidates; and
    generating a new model on the basis of the combination of the model candidates updated at the updating.

* * * * *